Dec. 2, 1958  J. BAKKER  2,862,393
VIBRATING APPARATUS FOR CONCRETE OR LIKE MATERIAL
Filed March 6, 1956
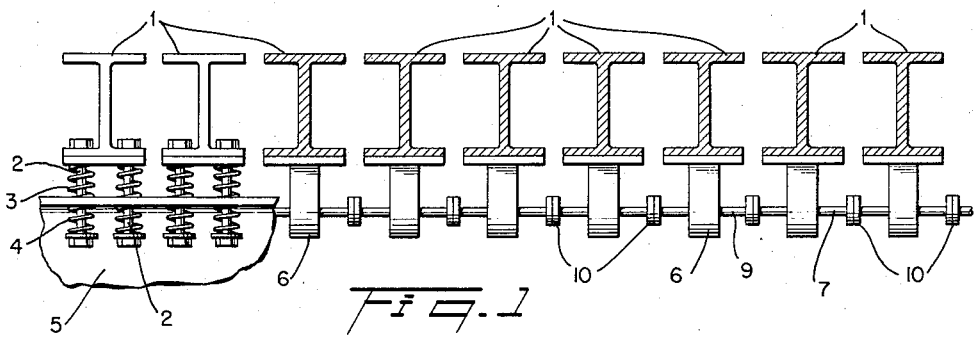
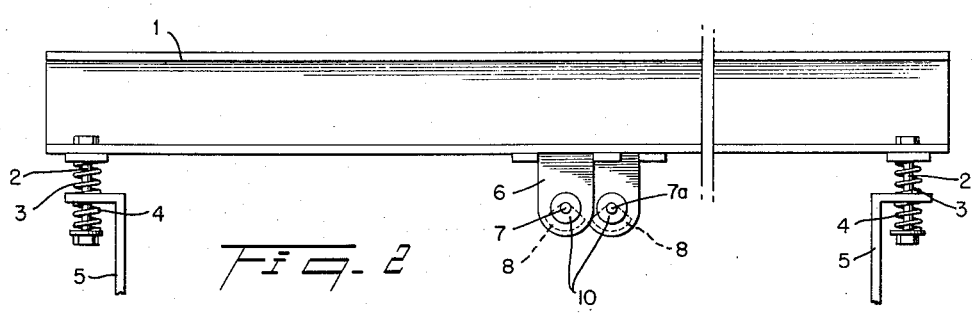
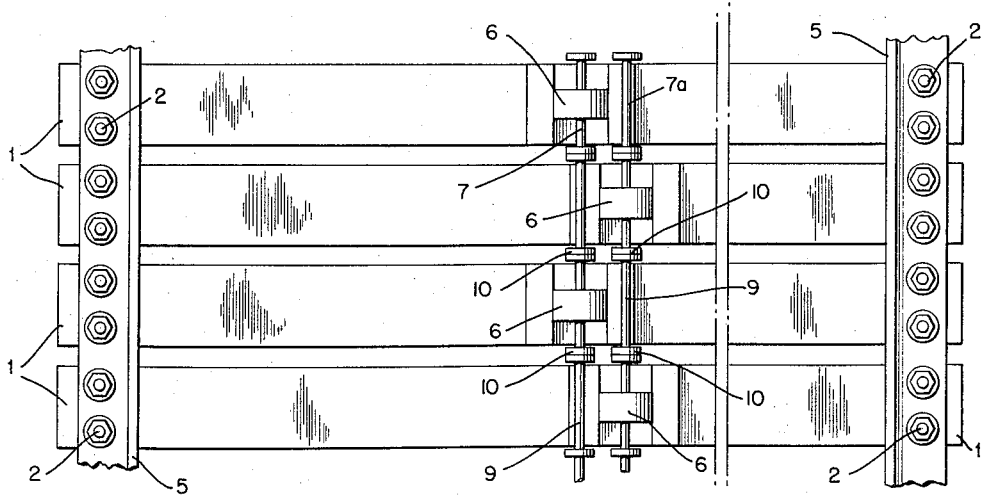
INVENTOR.
JOHANNES BAKKER
BY
*Robert E. Burns*
ATTORNEY

| United States Patent Office | 2,862,393
Patented Dec. 2, 1958 |
|---|---|

2,862,393

VIBRATING APPARATUS FOR CONCRETE OR LIKE MATERIAL

Johannes Bakker, Lange Ruige Weide, Netherlands

Application March 6, 1956, Serial No. 569,791

2 Claims. (Cl. 74—61)

The invention relates to a vibrating apparatus for concrete or like plastic hardening material, having a vibrating surface which is resiliently connected to a supporting frame and consists of a number of separate parts lying beside one another, which are each vibrated by rotatable excentric masses arranged on the under side thereof and in which the excentric masses are mutually coupled out of phase in such a manner that they jointly transmit a multiple of the frequency of oscillation of each of the masses to the material to be vibrated.

Such a vibrating apparatus is already known. In order to prevent shifting to one side of the object to be vibrated, with such apparatus two excentric masses may be arranged on both ends of each of the parts of the vibrating surface, which masses are mutually in phase, but are rotated in opposite direction. In this way a linear vertical vibration is obtained. For high frequencies, and especially for vibrating apparatus of great length, such as stretching yarns serving at the same time as vibrating apparatus, which may have a length of tens meters, this construction would become expensive.

The invention aims at providing a vibrating apparatus which is considerably more simple and less expensive and with which shifting of the object to be vibrated to one side of the vibrating apparatus is prevented.

According to the invention the excentric masses which are mutually out of phase, are arranged mutually staggered in two parallel rows behind one another on each of the parts of the vibrating surface and are driven in common by spindles rotating with the same speed but in opposite directions. In this way the number of excentric masses with their bearings and attachments is reduced to one half of the number otherwise necessary, while yet displacement of the object to be vibrated will not take place as the horizontal components of the impulses which the object receives from the vibrating parts of the vibrating surface, are alternately directed to one side and to the other.

Under definite circumstances it can happen that the laterally directed components of the vibrating impulses, which the object receives, on the whole length of the vibrating apparatus always take place somewhat earlier in one direction than in the other. In order to prevent any possibility of shifting of the object in one direction or the other by such circumstances, appropriately the excentric masses on each spindle are arranged subdivided in subgroups completing one another—just like the groups belonging to one another on the two spindles—by that they are successively arranged with a mutual phase difference equal to the full phase difference between the masses in one group on the spindles. If e. g. an eightfold vibration with respect to the fundamental frequency is to be transmitted to the object, the four excentric masses mutually 90° out of phase, on one spindle will lie 45° out of phase with respect of the four excentric masses on the other spindle which are also mutually 90° out of phase. In this case each subgroup on a spindle forms in itself a symmetric load for this spindle, but the subgroups will mutually lag or lead 45°. If in this case the subgroups are arranged all in the same manner behind one another on the spindles, the lateral components of the vibrating impulses on the object in one direction will always lag somewhat with respect of those in the other direction. For preventing this phenomenon the subgroups on the same spindles are arranged mutually 45° out of phase behind one another.

The invention will now be further elucidated with reference to the drawing in which an example of performance of the invention is shown partly diagrammatically. In the drawing:

Fig. 1 shows a side elevation, partially in cross-section, of a vibrating apparatus according to the invention, Fig. 2 an end view, and Fig. 3 a bottom view thereof.

The vibrating apparatus according to the drawing, which may be a vibrating table or a part thereof or a part of a stretching yarn, possesses a vibrating surface which is formed by an adequate number of narrow vibrating surface parts 1 lying at regular small mutual distances behind one another. These vibrating surface parts consist of I-girders secured at adequate mutual distances with the aid of bolts 2 and upper springs 3 and under springs 4 to a supporting frame 5 in such a manner that they are movable in vertical direction. At the bottom side the I-girders are each provided near its middle with an eccentric mass 8 rotatably mounted on a spindle 7 and 7a respectively in a closed housing 6. The eccentric masses are arranged in two rows under the transverse girders or beams and are mutually coupled in each row by additional spindles 9 and flexible couplings 10 which are indicated diagrammatically in the drawing and the spindles are rotated in opposite directions but mutually with the same speed by a driving means not shown, e. g. an electromotor. For obtaining a rotation in opposite directions with equal speeds these spindles may be coupled by two toothed wheels with equal number of teeth. The excentric masses are adjustably arranged in their closed housings and are arranged mutually out of phase on the two driving spindles 7, 7a. The excentric masses are arranged in staggered relation to the successive I-girders. Further the excentric masses are combined in groups of e. g. two, four, or eight or ten pieces, in such a manner that, when driven at a speed of e. g. 3000 revolutions/min., they jointly give a vibrating frequency of the vibrating surface of 6000 to 30,000 vibrations/min. or higher.

With a division of the vibrating surface parts in groups of e. g. four I-girders, this can e. g. be obtained by adjusting the excentric masses of the beams 1 and 3 of each group mutually 180° out of phase on one spindle and the excentric masses of the beams 2 and 4 of this group also mutually 180° out of phase on the other spindle, but at the same time taking care thereof that the excentric masses on one spindle lie 90° out of phase with respect of the excentric masses on the other spindle. The excentric masses form a symmetric load for each spindle, which is particularly favourable in view of the necessary driving power. During rotation of the spindles 7, 7a in opposite directions vibrating impulses will be transmitted by the excentric masses to a mould arranged over the I-girders or an additional transmitting surface, which vibrating impulses contain a lateral component directed in a direction corresponding to the lateral movement of the excentric masses in the upper part of their rotational movement. These lateral components of the vibrating impulses will compensate one another with respect of the mould or the additional transmitting surface lying over the I-girders but the mass to be vibrated in the mould or moulds will thereby assume a concave or convex upper surface in the mould dependent on the direction of rotation of the two spindles. As the replenishing of the mass to be vibrated can occur more easily in the middle of the mould, appropriately the direction of rotation of the spindles is chosen in such a manner that a concave or hollow upper surface of the mass to be vibrated is formed in the moulds. This is obtained when the two spindles 7, 7a are driven in such a manner that the excentric masses move to one another in the upper parts of their rotational movement.

If, as in the case described above, an even number of excentric masses are arranged on each spindle for each group, and if the excentric masses for each group are always arranged in the same manner on the spindles, during working the lateral impulse components of one spindle will always lag or lead with respect of those on the other spindle. Under definite circumstances this may be undesirable and therefore it is recommended to arrange the excentric masses belonging to successive groups mutually out of phase with a phase difference equal to the full phase difference of the excentric masses belonging to a group.

If groups of e. g. five vibrating surface parts are used with a mutual phase difference of 72° for obtaining a fivefold vibrating frequency with respect of the fundamental frequency, necessarily in each group as asymmetric subdivision on both spindles has to take place. This asymmetry can then be compensated in the next group.

In the above always cases were discussed in which the successive vibrating surface parts carry an excentric mass which is coupled with one spindle and another which is coupled with the other spindle. However, it is of course also possible to provide two or even more successive beams with excentric masses coupled with the same driving spindle, which masses show an adequate mutual phase difference.

For obtaining an equal vibration of the vibrating surface parts by the single excentric masses, the excentric masses may be fixed all exactly in the middle under the vibrating surface parts. In this case the vibrating surface parts are mounted mutually shifted in lateral direction of the apparatus over a distance equal to one half of the distance between the two driving spindles on the supporting frame. If the distance between the two driving spindles is small, however, the vibrating beams can also be mounted in such a manner on the supporting frame that they end in the same plane beside one another, as shown in the drawing.

Having now particularly described and ascertained the nature of my said invention and in what manner the same is to be performed I declare that what I claim is:

1. A vibrating apparatus for vibrating concrete and like hardening material comprising, in combination, a supporting frame, a plurality of spaced but closely adjacent supporting members resiliently mounted on said supporting frame and providing a supporting surface for the material to be vibrated, an eccentric mass rotatably mounted on each of said members, the eccentric masses being disposed in two parallel rows with the masses of one row arranged on alternate separate members of the supporting surface and the masses of the other row arranged on the other alternate members of said supporting surface, means comprising parallel spindles rotatably driven at the same speed in opposite directions coupling the masses in each row, the rotatable masses being coupled mutually out of phase in such a manner that they jointly transmit a multiple of the frequency of oscillation of each of the masses to said members and to the material to be vibrated.

2. Vibrating apparatus according to claim 1, in which the eccentric masses on each spindle are divided in subgroups which are arranged mutually out of phase on the spindles with a phase difference equal to the full phase difference between the masses in a group.

References Cited in the file of this patent

UNITED STATES PATENTS 2,531,706     Signeul _____ Nov. 28, 1950
2,722,407     Bakker _____ Nov. 1, 1955